Aug. 17, 1965    R. G. FRASHOUR ETAL    3,200,553
COMPOSITION BOARD FLOORING STRIP
Filed Sept. 6, 1963
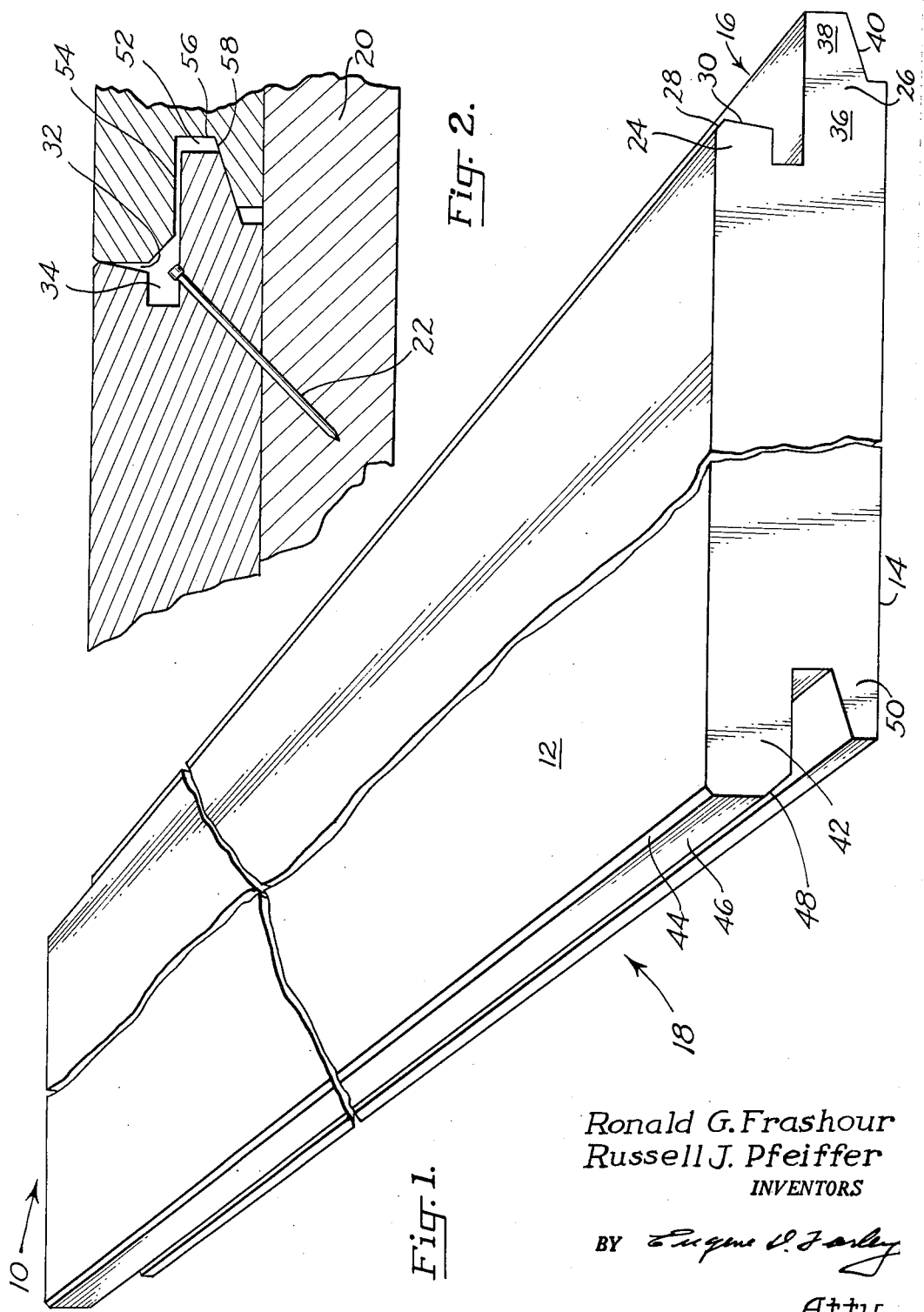
Ronald G. Frashour
Russell J. Pfeiffer
INVENTORS
BY *Eugene D. Farley*
Atty.

3,200,553
COMPOSITION BOARD FLOORING STRIP
Ronald G. Frashour, Roseburg, Oreg., and Russell J. Pfeiffer, Memphis, Tenn., assignors to Forrest Industries, Inc., Dillard, Oreg., a corporation of Oregon
Filed Sept. 6, 1963, Ser. No. 307,176
2 Claims. (Cl. 52—595)

This invention relates to flooring strips made of composition board, particularly of wood particle board.

The use of flooring strips made from wood composition board as substitutes for conventional hardwood flooring has several important advantages. Of greatest importance, of course, is the relatively low cost of wood composition board, as opposed to the cost of conventional hardwood flooring materials. Other inherent advantages are the ability of wood composition board to be cut precisely to size, thereby minimizing allowances for undersized stock; the adaptability of wood composition board to prefinishing; and the hardness of wood composition board, which makes it highly resistant to wear and abrasion.

Heretofore, the application of composition board as flooring has been restricted severely by the fact that when it is fabricated in the usual tongue and groove form, it is susceptible to breakage during the nailing operation by which it is fixed to the subflooring.

Also, the internal structure of composition board is such that, when wood composition board flooring strips of conventional tongue and groove construction are blind nailed to the subflooring, the nail heads tend to raise the surface portions immediately above them, forming readily observable surface projections.

Still further, joining of composition board flooring strips has been difficult to accomplish because of accumulations of dirt, wood particles, and other refuse which enter the grooves of the flooring strips.

Accordingly it is the general purpose of the present invention to provide a flooring strip of such a design that it may be fabricated of wood or other composition board at low cost, the flooring being applied to the subflooring in the conventional manner without danger of nailing breakage, without the nail heads showing through the surface of the flooring after it has been applied, and providing accommodation for the refuse material in the joints uniting adjacent strips so that the strips may be joined effectively.

The manner in which the foregoing and other objects of the invention are accomplished will be apparent in the accompanying specification and claims considered together with the drawings wherein:

FIG. 1 is a foreshortened view in perspective of one of the herein described flooring strips; and FIG. 2 is a fragmentary, sectional view of two adjacent flooring strips of the invention in their applied condition.

In the practice of the invention composition board sheets first are prepared in the usual manner from small pieces of wood, bagasse, or other lignocellulose. The sheets may comprise the products familiarly known as particleboard, hardboard, or flakeboard and may be manufactured in the usual sizes, for example 4 x 8 feet or 4 x 16 feet. The densities of the board normally will be in excess of 40 pounds per cubic foot. By reason of the method of their manufacture, the boards are characterized by having hard, shiny, abrasion-resistant surfaces.

In the manufacture of flooring from such sheets, the top surfaces of the sheets first may be filled and sealed with conventional materials, after which they may be presurfaced with a suitable surfacing material, followed by baking if the application of elevated temperature is required.

Next the filled and sealed sheets are ripped on a slat bed machine or otherwise into strips of the preselected width, for example, strips having a width of four inches.

The strips then are run through a flooring machine. This incises the opposite side edges of the strips. Thereafter the incised strips may be finished further with a suitable floor-finishing material to seal off the raw edges exposed by machining.

In this manner there is cut into the strips the unique tongue and groove configurations which characterize the flooring of the invention and are responsible for the successful application of wood composition board to the manufacture of a product which successfully may be secured to subflooring by nailing.

The construction and configuration of the tongued and grooved edges of the flooring strips of the invention is illustrated in the drawings.

As shown in FIG. 1, each strip, indicated generally at 10, is provided with a face surface 12, a bottom surface 14, a tongued edge 16, and a grooved edge 18. The strips are adapted to be laid edge to edge, with the tongue inserted in the groove. They are nailed to subflooring 20, using nails 22 applied manually with a hammer, or with a conventional nailing machine.

The tongued edge 16 of the flooring strip broadly includes an upper abutment section 24 and a lower tongue section 26.

The upper abutment section is designed to abut against a meeting abutment section of the grooved edge of the adjacent flooring strip. The upper corner of the abutment section is formed with a beveled section 28 having for its function improving the appearance of the laid flooring by making less conspicuous any thickness differential occasioned by minor dimensional variation of the strips.

The meeting surface 30 included in abutment section 24 is formed with a slight inward bevel, as is seen particularly in FIG. 2. The angle of the bevel preferably is very slight, of the order of 5 to 10 degrees from the vertical, to provide an abutment area of sufficient depth to permit resanding and refinishing of the flooring when it is in service. The recess 32 thus formed accommodates dirt, wood particles and other refuse so that a tight joint is obtained.

As one of the principal features of the invention, the lower portion of abutment section 24 is severely recessed to provide a pocket 34 of sufficient extent to accommodate the heads of nails 22 as well as material displaced during the nailing operation. This is important because either the nail heads or the displaced material tends to cause a slight but readily visible bulging of the flooring surface, detracting from its appearance.

Lower tongue section 26 of tongued edge 16 of strip 10 comprises broadly two sections.

A base section 36 of substantial extent underlies recess 34 and extends substantially beyond the plane of the meeting edges of the abutment sections of the tongued and grooved flooring edges. The bottom surface of the base section 36 bears squarely against subflooring 20.

This construction serves the important function of providing a nailing base through which nails 22 may be driven without breaking off portions of the tongue by hammer blows, or by splitting them off because of the wedging action of the nails. In addition, a solid bearing contact of the flooring against the subflooring is provided. To provide the desired stability, the thickness of the base portion preferably is substantially one-half the total thickness of the strip.

The outer, groove-penetrating portion 38 of tongue section 26 necessarily is spaced upwardly from the subflooring and is provided with an upwardly and outwardly inclined lower surface 40.

Grooved edge 18 likewise is divided into two sections.

The upper abutment section 42 is provided with a beveled corner surface 44, the bevel of which is complementary to that of beveled corner 28 on the tongued edge, and which serves the same function of making less conspicuous slight irregularities of the flooring surface.

Abutment surface 46 of abutment section 42 may be square with face surface 12 of the flooring, or it may have a slight inward bevel. In either event it cooperates with abutment surface 30 of the tongued edge in providing a refuse-accommodating recess 32, previously described.

The lower corner of abutment section 42 is formed with a beveled surface 48. This results in a recessed region which communicates with recess 34 on the tongued edge, enlarging it to provide adequate space for the heads of nails 22, as well as for the accumulation of refuse.

Grooved section 50 of edge 18 is provided with a groove 52, FIG. 2. This is of sufficient extent to accommodate the groove-penetrating portion 38 of the tongue, with sufficient clearance left above the upper and end surfaces of the tongue to insure the formation of a good joint.

Groove 52 is defined by a ceiling surface 54, an end surface 56, and a floor surface 58. The latter is sloped downwardly and outwardly, reciprocally to the slope of the undersurface 40 of extension 38 of the tongue. It provides a locating and bearing surface for engagement by the tongue.

The strip flooring of the invention is laid in the usual manner. One strip, for example the left hand strip of FIG. 2, is nailed to the subflooring with nails 22. During this operation the nails penetrate the thick nailing base 36 of the tongue, causing the flooring to bear solidly against the subflooring. Also, the nails may be driven cleanly, whether manually or with a nailing machine, without danger of the hammer blows breaking off portions of the tongue, or of the nails splitting the substance of the tongue, even though the tongue is made of a composition material comprising a multiplicity of small pieces glued together.

The second flooring strip, for example the right-hand strip of FIG. 2, then is placed adjacent the first strip with groove 52 receiving the groove-penetrating portion 38 of tongue 26. Meeting surfaces 30, 46 of the two strips are placed in close abutment, and overlying surface 40 of the tongue is placed solidly in contact with the underlying surface 58 of the groove. This is made possible in part by the precision cutting of the flooring in the first instance, and also by the fact that the precision of the surfaces is preserved by the accumulation of any debris in recess 34 and in the inner end of groove 52.

After the second and subsequent strips have been nailed in place, the danger of surface raising caused by pressure of the heads of nails 22 on the flooring substance immediately above is eliminated, since the heads of the nails and the nail-displaced material are received in the pockets in recesses 34.

Surfacing of the freshly laid flooring may not be necessary if it has been presurfaced in the manner outlined above. After a period of use, however, it may be resurfaced in the usual manner thereby affording a long service life.

Having thus described the invention, we claim:

1. A composition board flooring strip adapted for nailing to subflooring,
   (a) each strip having a face surface, a bottom surface, a tongued edge and a grooved edge, the tongued edge being receivable in the grooved edge of an adjacent strip in edge-to-edge tongue and groove relation,
   (b) the tongued edge comprising an upper abutment section having an outer meeting surface extending downward from the face surface of the strip to the upper side of an inwardly directed recess in the tongue section, the recess being dimensioned to house a nailhead without contact of the nailhead with the upper surface of the recess,
   (c) the tongued edge incuding a lower tongue section which projects outward beyond the outer meeting surface of the upper abutment section,
   (d) the lower tongue section comprising an inner base portion extending between the recess and the bottom surface of the strip, and an outer groove-penetrating portion having a top surface co-planar with the top surface of the base and a bottom surface spaced upwardly from the bottom surface of the strip and terminating at its inner end outwardly of the meeting surface of the abutment section,
   (e) the base portion of the tongue section being dimensioned to receive nails,
   (f) the grooved edge comprising an upper abutment section having an outer meeting surface extending downward from the face surface of the strip to the upper side of an inwardly directed groove dimensioned to receive the groove-penetrating portion of the tongue section.

2. The composition board flooring strip of claim 1 wherein the outer meeting surface of the upper abutment section of the grooved edge extends downward from the face surface of the strip to the upper side of an inwardly beveled surface which extends to the upper side of the inwardly directed groove.

References Cited by the Examiner

UNITED STATES PATENTS 2,227,878  1/41  Crooks _____ 20—8
2,276,071  3/42  Scull _____ 20—15

CHARLES E. O'CONNELL, *Primary Examiner.*

REINALDO P. MACHADO, HARRISON R. MOSELEY, *Examiners.*